US008578760B2

(12) United States Patent
Calhoun et al.

(10) Patent No.: US 8,578,760 B2
(45) Date of Patent: Nov. 12, 2013

(54) CONTAINER INSPECTION UTILIZING LINEAR FORCE ACTUATOR

(75) Inventors: Steve Calhoun, Rolling Hills, CA (US); David Kriebel, Long Beach, CA (US); Andrew Barmeyer, Long Beach, CA (US)

(73) Assignee: Industrial Dynamics Company, Ltd, Torrance, CA (US)

(*) Notice: Subject to any disclaimer, the term of this patent is extended or adjusted under 35 U.S.C. 154(b) by 201 days.

(21) Appl. No.: 12/874,131

(22) Filed: Sep. 1, 2010

(65) Prior Publication Data

US 2011/0056275 A1    Mar. 10, 2011

Related U.S. Application Data

(60) Provisional application No. 61/240,510, filed on Sep. 8, 2009, provisional application No. 61/240,849, filed on Sep. 9, 2009.

(51) Int. Cl.
*G01M 3/34* (2006.01)

(52) U.S. Cl.
USPC ........................................ 73/49.3; 73/865.8

(58) Field of Classification Search
USPC ...................... 73/45.4, 49.3, 865.8
See application file for complete search history.

(56) References Cited

U.S. PATENT DOCUMENTS

| | | | |
|---|---|---|---|
| 3,751,972 A | 8/1973 | Has | |
| 3,998,091 A | 12/1976 | Paquette et al. | |
| 4,223,790 A | 9/1980 | Yoshida | |
| 4,517,827 A | 5/1985 | Tapscott | |
| 4,663,964 A * | 5/1987 | Croce | 73/49.3 |
| 4,671,101 A | 6/1987 | Franklin | |
| 4,706,494 A | 11/1987 | Creed et al. | |
| 4,715,215 A | 12/1987 | Perhach et al. | |
| 4,756,184 A | 7/1988 | Reishus et al. | |
| 4,771,630 A | 9/1988 | Croce et al. | |
| 4,862,732 A * | 9/1989 | Raymond et al. | 73/45.4 |
| 4,898,023 A | 2/1990 | Yamada et al. | |

(Continued)

FOREIGN PATENT DOCUMENTS

GB        2196130        4/1988

OTHER PUBLICATIONS

SMAC, LAL95 Linear Actuator, Sep. 1, 2009, 1pg.
SMAC, Linear Actuator Set Up Information, Sep. 1, 2009, 1pg.

(Continued)

*Primary Examiner* — Hezron E Williams
*Assistant Examiner* — Nathaniel Kolb
(74) *Attorney, Agent, or Firm* — Vista IP Law Group LLP (57) ABSTRACT

Container inspection utilizing a linear actuator. A linear actuator shaft is movable such that the shaft end temporarily contacts the container. A feedback parameter resulting from or related to a change of an electrical property of the linear actuator, is detected or determined by a controller, which determines whether the container satisfies pre-determined inspection criteria, e.g., whether the container is properly sealed, satisfies pressure criteria and/or has unacceptable vacuum. These determinations are made based at least in part upon one or more detected feedback parameters including or related to at least one of a change of position of the shaft, a change of velocity of the shaft and a force or torque exerted by the container to the shaft. In this manner, high speed leak detection is performed without a load cell or force transducer, without squeezing or compressing bottles and without determining fill level changes.

19 Claims, 10 Drawing Sheets

(56) References Cited

U.S. PATENT DOCUMENTS

| | | | |
|---|---|---|---|
| 4,901,558 A | 2/1990 | Leining et al. | |
| 5,226,316 A | 7/1993 | Mally et al. | |
| 5,507,177 A | 4/1996 | Focke | |
| 5,528,925 A * | 6/1996 | Sherepa et al. | 73/41 |
| 5,531,101 A | 7/1996 | Fenlon | |
| 5,533,385 A | 7/1996 | Frievalt | |
| 5,542,288 A | 8/1996 | Fenlon | |
| 5,767,392 A | 6/1998 | Belcher et al. | |
| 6,105,419 A | 8/2000 | Michels et al. | |
| 6,427,524 B1 | 8/2002 | Raspante et al. | |
| 6,470,733 B1 | 10/2002 | Barr | |
| 6,840,087 B2 | 1/2005 | Lehmann | |
| 6,918,285 B2 | 7/2005 | Chevalier, Jr. et al. | |
| 7,156,238 B2 | 1/2007 | Elbersen | |
| 7,475,590 B2 | 1/2009 | Yokota et al. | |
| 7,584,650 B2 | 9/2009 | Lehmann | |
| 2007/0295060 A1 | 12/2007 | Delgado et al. | |
| 2008/0127716 A1 * | 6/2008 | Eliasson | 73/45.4 |

OTHER PUBLICATIONS

SMAC, Moving Coil Actuators LA Series, Sep. 1, 2009, 20pgs, 2009 Rev.3.
SMAC, Actuators User Manual, Sep. 1, 2009, 52pgs, P. Marks 02.07, Revision 1.8, Carlsbad, California.
SMAC, Controllers and Amplifiers, Sep. 1, 2009, 2pgs.

* cited by examiner

CONTAINER INSPECTION UTILIZING LINEAR FORCE ACTUATOR

CROSS REFERENCE TO RELATED APPLICATIONS

This application claims the benefit under 35 U.S.C. §119 of U.S. Provisional Application No. 61/240,510, filed Sep. 8, 2009 and U.S. Provisional Application No. 61/240,849, filed Sep. 9, 2009, the contents of which are incorporated herein by reference as though set forth in full.

BACKGROUND

The invention is generally related to automated processing of containers and, more particularly, to systems and methods for detecting container leaks, container pressures (whether too high or too low) and/or inadequate vacuum. Products ranging from bottled water and soft drinks to household products are packaged in containers that have flexible surfaces or lids such as plastic containers. For this purpose, plastic or similarly flexible containers, cans or bottles may be transported on a conveyor to different processing stations including fluid fill level check, labeling, foreign object check or other quality control, packaging and shipping stations.

Sometimes, however, containers are not properly sealed, thereby resulting in leaks and product defects, diminished product quality and loss of product. For example, the product may be flat or spoiled depending on the type of product. Leaks may also cause damage to surrounding structures including boxes, cases, crates and nearby products and property. Leaks may also occur on system components thereby requiring additional system maintenance and system downtime.

Such problems may occur with various types of containers or bottles including plastic containers or bottles that may be made of polyethylene terephthalate (PET) and other plastic materials. In certain known systems, bottlers or packagers dose PET containers with liquid nitrogen ($LN_2$) to create internal container tension in order to ensure that the container maintains its shape. An under-dosed container may crumple due to lack of sufficient internal pressure that is required in order to maintain the container shape, and an overdosed container may bloat or deform. Under-dosed and over-dosed containers may cause complications or problems on a bottling line and may result in customer complaints regarding product quality and defects.

One known method for checking container seals for leaks and dosage levels is visually and manually inspecting individual bottles. Visual inspection may have some degree of effectiveness, assuming that leaks and unacceptable pressure and vacuum can actually be visually identified by a human eye, but such methods may not be accurate since it may be difficult for a person to identify container leaks, unacceptable pressures and vacuums, and bottle deformities. Further, such methods are very labor intensive, costly and time consuming. In view of these problems and limitations, such inspection methods may not be practical for automated and high-speed container processing.

Other systems have been introduced in order to facilitate faster inspection of plastic containers for leaks and improper pressures. One known system is available from or utilized by Teledyne Taptone and is a passive inspection system that utilizes a load sensor. The load sensor is positioned within the conveyor or bottle path and is stationary and at a fixed location. As containers are transported by the conveyor, they pass by and run into or come into contact with the stationary load sensor within the container path. A belt or anvil is provided on the opposite side of the container at the same lateral location as the stationary load sensor to prevent the container from falling over or being laterally re-positioned when the containers run into or contact the stationary load sensor as they move past the stationary load sensor. If the stationary load sensor detects a force that is less than a certain force, the output of the stationary load sensor is used to activate a downstream rejection system to remove the container from the conveyor or to indicate that the container has a leak.

Another known system is available from or utilized by Teledyne Taptone and Heuft Systemtechnik GMBH and employs a compression system that squeezes containers to determine how the fluid fill level in the container changes. In this system, a camera or x-ray device is arranged relative to a container transported on a conveyor to detect or measure a first fill level. The container is transported by the conveyor between two belts that compress the container which, in turn, causes the fill level in the container to rise to a higher, second fill level. Another camera or x-ray device is positioned to detect the higher, second fill level while the container is being compressed. A second fill level of a defective or improperly sealed bottle exhibits an unacceptable fill level increase, whereas a properly sealed bottle that does not have leaks or low pressure exhibits a lower or more moderate fill level increase. Upon exiting the belt compression area, the pressure on the bottle is relieved, and the fill level returns to the first fill level. Fill level data is used to reject the container if the fill level increases beyond an acceptable elevated fill level. Otherwise, the container proceeds on the conveyor to the next station.

While inspection systems such as those utilized by Teledyne Taptone and Heuft Systemtechnik GMBH may provide a certain degree of effectiveness for detecting container leaks, they have a number of problems and shortcomings. For example, such systems utilize belts to guide and/or compress containers. These compression belts, however, may wear out and must be replaced. This results in increased system costs, maintenance, costly system downtime and reduced throughput. Further, containers that leak may leak on the compression belts that may come into contact with various other containers and systems components. In certain instances, e.g., when the fluid is juice or a sugar based product, leaks on compression belts require additional maintenance or cleaning. Other types of products, e.g., oils and lotions, may require more frequent maintenance and cleaning. Products may also leak onto surfaces of other containers, thereby resulting in reduced product quality since labels may be damaged or a surface that is handled by a consumer may be sticky or tacky. Further, it may be difficult to apply labels to outer surfaces of containers on which leaks have occurred. Moreover, fluids leaked on compression belts may result in growth of mold, thus resulting in hygiene and health code issues. Additionally, compressing containers in order to test for leaks may actually cause the containers to leak, thereby causing the very problems that such systems are designed to detect.

SUMMARY

One embodiment is directed to a method of inspecting a container and comprises transporting a container on a conveyor to an inspection area such that the container is positioned between a support member in the inspection area and a distal end of a translatable member of an electronically controlled linear actuator that is operably coupled to a controller. The method further comprises activating the electronically controlled linear actuator in response to an output of the controller to move the translatable member from an initial position at which a distal end of the translatable member does not engage a portion of the container to an extended position at which the distal end temporarily engages the portion of the container and pushes the container against the support member, detecting, without a load cell or force transducer, an electrical feedback parameter resulting from the translatable member contacting the portion of the container, the electrical feedback parameter comprising an electrical attribute of the linear actuator and providing the detected electrical feedback controller to an input of the controller. A determination is then made, using the controller, whether the container satisfies pre-determined inspection criteria based at least in part upon the detected electrical feedback parameter.

A further embodiment is directed to a system for inspecting a container and comprises a conveyor, a linear actuator and a controller. The conveyor is configured or operable for transporting the container to an inspection area including a support member. The linear actuator includes a translatable member such that a container transported by the conveyor can be positioned between the support member and a distal end of the translatable member. The controller is operably coupled to the linear actuator and configured to cause movement of the translatable member from an initial position at which the distal end of the translatable member does not engage a portion of the container to an extended position at which the distal end temporarily engages the portion of the container such that the container is pushed against the support member. The controller is programmed, configured or operable to detect, without a load cell or force transducer, an electrical feedback parameter. The electrical feedback parameter, according to one embodiment, is an electrical attribute of the linear actuator and results from the translatable member contacting the portion of the container. The controller is further programmed, configured or operable to determine whether the container satisfies pre-determined inspection criteria based at least in part upon the detected electrical feedback parameter.

In a single or multiple embodiments, the container and the linear actuator are arranged or positioned relative to each other such that the linear actuator contacts a flexible portion of the container when the linear actuator is in the extended position. The portion contacted may be a sidewall of the container. In other embodiments, the container and the linear actuator are arranged or positioned such that the linear actuator contacts a flexible cap or lid of the container, which may be a substantially rigid container, when the linear actuator is in the extended position. The flexible portion contacted may be plastic, aluminum, paperboard, a flexible metals or a foil.

In a single or multiple embodiments, following the determination of whether the container satisfies pre-determined criteria, the container is transported past an inspection area and a second container is transported to the inspection area. For this purpose, the conveyor can be in continuous motion such that the linear actuator engages the first container and the second container while both containers (and additional containers) are on and transported by the conveyor. The second container is positioned between the support member in the inspection area and the distal end of the translatable member. The electronically controlled linear actuator is actuated in response to an output of the controller to move the translatable member from an initial position at which a distal end of the translatable member does not engage a portion of the second container to an extended position at which the distal end temporarily engages the portion of the second container, thereby pushing the second container against the support member. The controller, without the user of a load cell or force transducer, detects a second electrical feedback parameter resulting from the translatable member contacting the portion of the second container. In certain embodiments, the second electrical feedback parameter is a second electrical attribute of the linear actuator. The detected second electrical feedback is provided as an input to the controller, which determines whether the second container satisfies pre-determined inspection criteria based at least in part upon the detected second electrical feedback parameter.

In a single or multiple embodiments, pre-determined inspection criteria is utilized to determine whether the container is properly sealed, which may be done without compressing the container between belts and without determining a fill level of the container, whether the container has excessive pressure, insufficient pressure, or inadequate vacuum.

In a single or multiple embodiments, the controller and the electronically controlled linear actuator form a closed loop feedback system for controlling the translatable member and detecting the electrical feedback parameter.

In a single or multiple embodiments, the controller determines a torque or force exerted by the container when the distal end of the translatable member contacts the container, and the torque or force is based at least in part upon the detected electrical feedback parameter such as a detected current of the linear actuator.

In a single or multiple embodiments, the detected electrical feedback such as a detected current is related to a component that is upstream of the linear actuator. In other embodiments, the detected electrical feedback parameter is related to a change of velocity of the translatable member or, in certain embodiments, a difference between a first velocity of the translatable member prior to contacting the portion of the container and a second velocity of the translatable member when the translatable member contacts the container. The container can be rejected or sorted if the change of velocity or a force related to the change of velocity satisfies pre-determined velocity or force criteria.

In a single or multiple embodiments, the detected electrical feedback parameter is related to a change of position of the translatable member. The translatable member can be moved at a fixed velocity against the container while measuring the position of the translatable member using an encoder attached directly to the translatable member. The position change is based at least in part upon a first, extended position of the translatable member resulting from the distal end of the translatable member moving freely and being unencumbered by the container, and a second position at which the translatable member contacts the portion of the container.

In a single or multiple embodiments, one or multiple feedback parameters can be detected, and determining whether the container satisfies pre-determined criteria may be based at least in part upon at least two detected electrical feedback parameters. For example, whether the container satisfies pre-determined inspection criteria can be based at least in part upon two electrical feedback parameters related to a change of velocity of the translatable member, a change of position of the translatable member, and a torque or force exerted by the container on the translatable member.

In a single or multiple embodiments, the container is moved in a first direction by conveyor, and the translatable member is moved in a linear manner in a second direction that is substantially perpendicular to the first direction. The translatable member may be positioned adjacent to a sidewall of the container or above the container.

In a single or multiple embodiments, the support member, such as a star wheel or worm gear, is rotatable to support the container on the conveyor while the container is being transported on the conveyor.

BRIEF DESCRIPTION OF THE DRAWINGS

The foregoing and other aspects of embodiments are described in further detail with reference to the accompanying drawings, wherein.

DETAILED DESCRIPTION OF ILLUSTRATED EMBODIMENTS

Embodiments are related to automated methods and systems for inspecting filled and capped containers made of flexible and semi-rigid materials such as plastic and aluminum and containers (which may be made of more rigid materials such as steel) having plastic or other flexible caps, to detect leaks, excessive or insufficient container pressures, and inadequate vacuum by utilizing feedback from a linear actuator, e.g., using a closed loop feedback system or by otherwise capturing and analyzing the effect of the tension in the container on the movement of a head or a shaft of the actuator. Feedback is related to a change of one or more electrical parameters of the linear actuator. Thus, embodiments may be utilized to determine whether a container 120 satisfies pre-determined inspection criteria, e.g., whether the container has a leak or whether properly sealed container 120 that does not have a leak nevertheless has insufficient pressure, excessive pressure, or inadequate vacuum.

During use, an active component such as a linear actuator is controlled such that a shaft of the linear actuator translates back and forth between home and contact positions to temporarily contact containers as the containers are transported on a conveyor system past the linear actuator. The containers are flexible or semi-rigid such that they may deform or bend slightly as a result of contact with the shaft. A "flexible" material is a material that allows an internal pressure to be detected based at least in part upon the rigidity of the sidewall or top of the container 120. Resulting changes in the shaft position, velocity and/or torque or force exerted by the container due to contact with the shaft alter one or more electrical parameters of the linear actuator. Feedback in the form of changes of these one or more electrical parameters is used to determine internal forces or pressures, which are used to determine whether the container has leaks, unacceptable variations in pressure, or inadequate vacuum. Thus, in contrast to various known systems, embodiments utilize a linear actuator and dispose of the need for compression belts, thereby resolving or improving upon maintenance, hygiene, system downtime and leak causation issues associated with such systems. Additionally, in contrast to various known systems, certain embodiments dispose of the need for optical devices such as cameras or x-ray equipment used to detect container fill levels.

Certain embodiments involve utilizing a linear actuator to determine whether the container satisfies pre-determined inspection criteria, which may relate to, for example, whether the container has a leak or unacceptable pressure or vacuum, and whether a downstream component should reject, sort or otherwise process a container having a leak or unacceptable pressures or vacuum. Embodiments may also be used to provide performance feedback of components upstream of the linear actuator such as, for example, a filler, capper or other upstream device or component. Thus, embodiments may involve determining whether a downstream component should reject, sort or otherwise process a container, performance feedback concerning upstream components, or both, and whether a container satisfies pre-determined inspection criteria may involve analysis of or adjustments to upstream system components.

Figure 1:
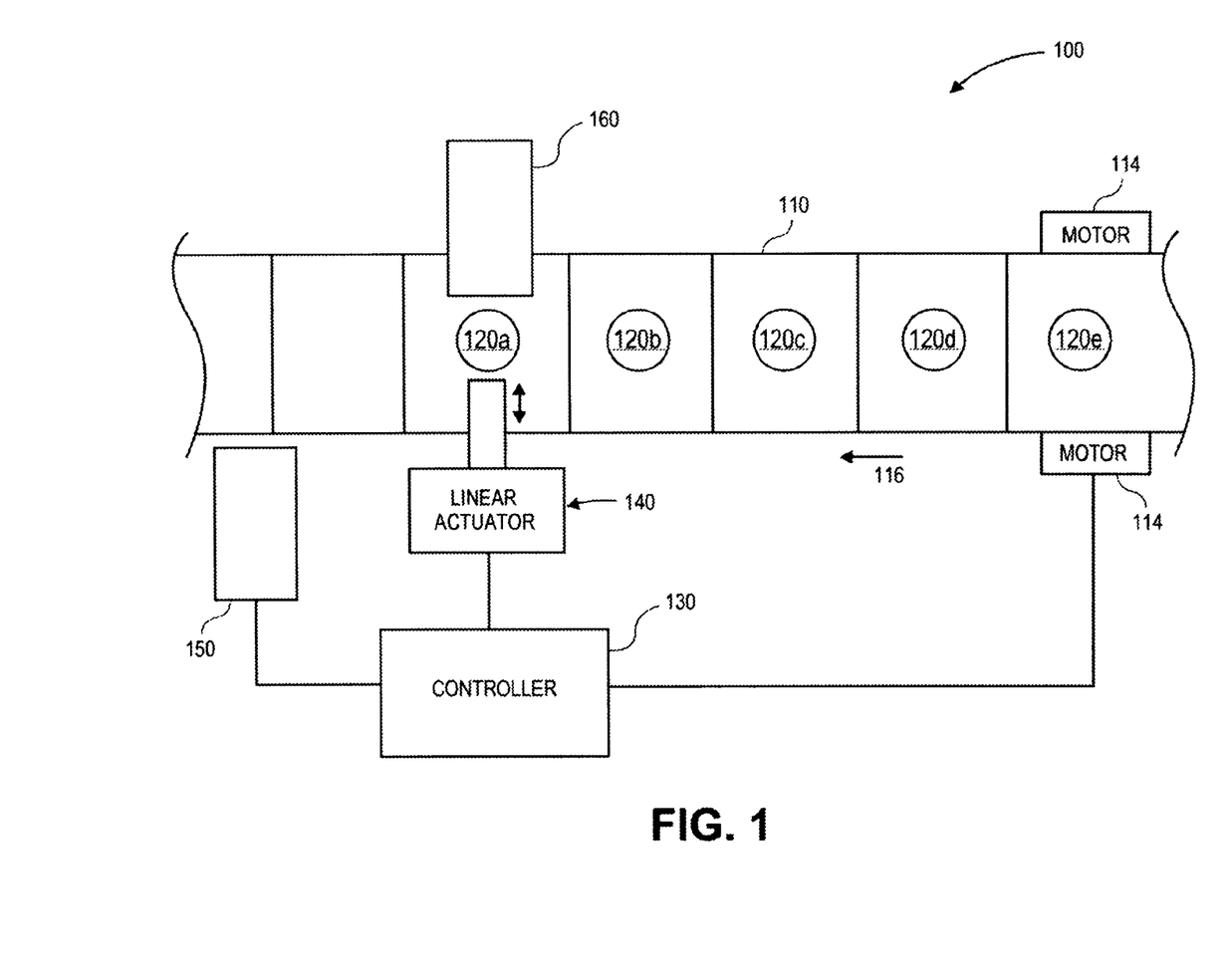
FIG. 1 illustrates a container inspection system constructed according to one embodiment.

Referring to FIG. 1, a container inspection system 100 constructed according to one embodiment includes a conveyor 110 that carries containers 120 that includes a fluid 122, a controller 130, a linear actuator 140 and a stabilization member 150. It should be understood that a system 100 may include various components upstream of the linear actuator 140 including, for example, a filler, capper or other upstream device or component.

Containers 120a-e (generally 120) are illustrated in FIG. 1, but it should be understood that much larger numbers of containers 120 can be processed and inspected with embodiments. Containers 120 are positioned on the conveyor 120, and a motor or drive mechanism 114 moves the conveyor 110 to transport the containers 120 to different processing stations such as filling, sealing, inspection, labeling and packaging stations. FIG. 1 illustrates a system or system station 100 that receives containers 120 that have been filled with a fluid 122 and capped or sealed and that are transported on the conveyor 110 in a first direction 116.

Figure 2:
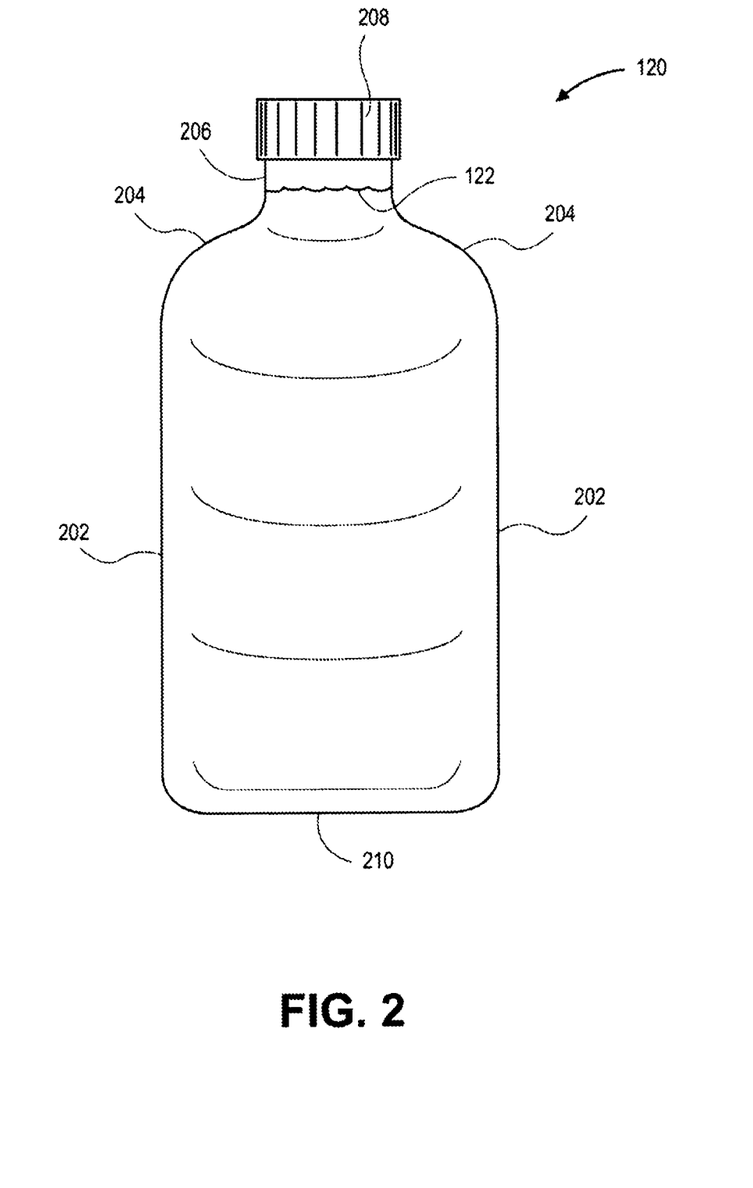
FIG. 2 illustrates a bottle that can be inspected with embodiments.

Referring to FIG. 2, one example of a container 120 that may be processed and inspected with embodiments is in the form of a bottle that includes a sidewall 202, a crown 204 and a neck 206 between a top or cap 208 and bottom or base 210. It should be understood that various container 120 types, sizes and shapes may be utilized in embodiments, and that containers may hold various types of fluids. For example, containers 120 may be made of or include various flexible, semi-rigid, deformable or resilient materials or components made of such materials including, but not limited to, plastic, aluminum, paperboard and flexible metals and foils. Containers 120 may also be more durable or rigid materials such as steel and that have a flexible, semi-rigid or deformable cap 208 that is made of plastic or another flexible or semi-rigid material. Containers may, for example, be in the form of bottles, cans, jars, jugs, tubs, cups, tubes, pouches and cartons and be filled with fluids 122 including, but not limited to, water, sports drinks, soft drinks, milk, juices, beverages such as beer, wine, spirits and other alcoholic beverages, lotions such as skin moisturizers, aloe, medications and sunscreens, cleaning products and automotive fluids such as motor oil. Thus, it should be understood that a container in the form of a bottle is provided as one example of a container 120 that can be inspected with embodiments.

Figure 3A:
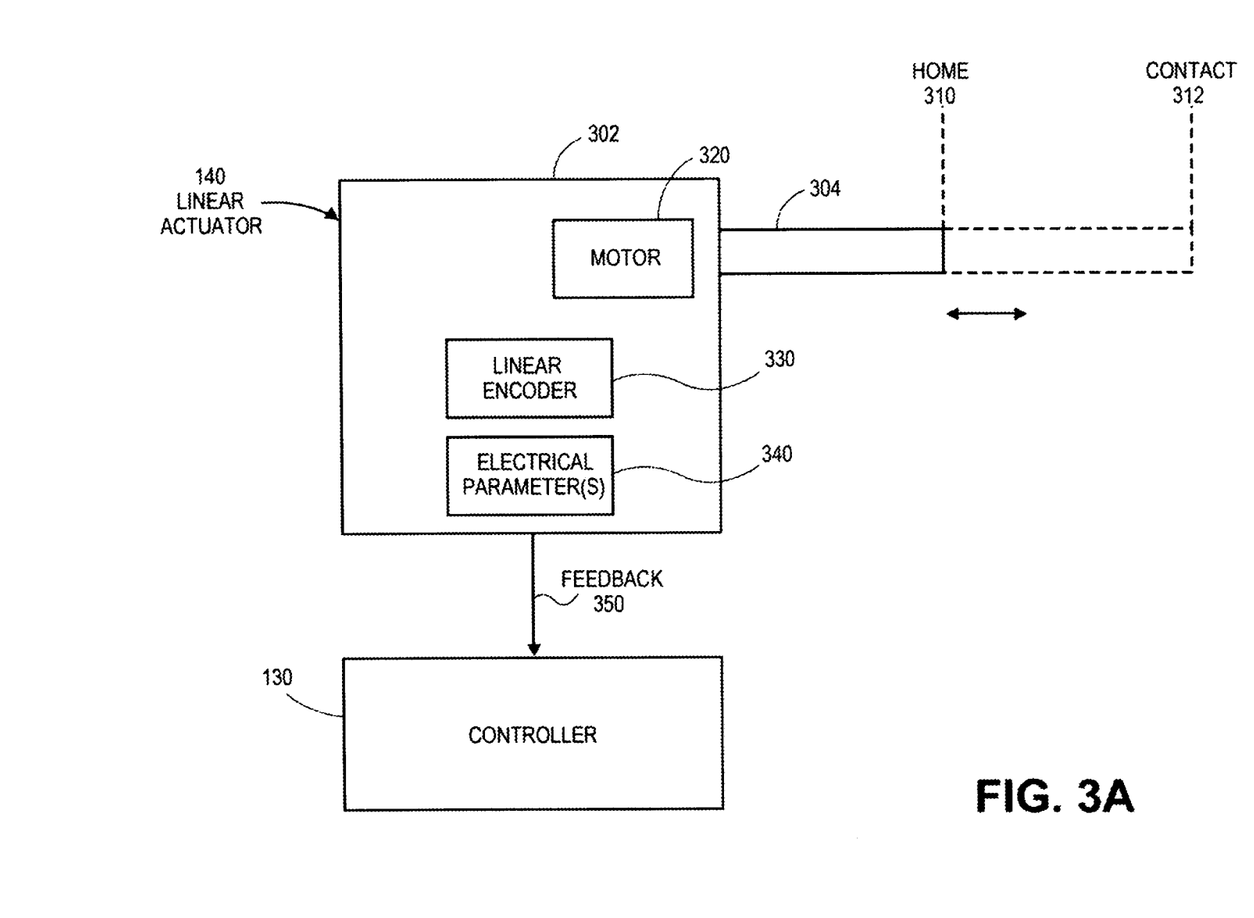
FIGS. 3A-B illustrate components and operation of a linear actuator and controller according to embodiments.
Figure 3B:
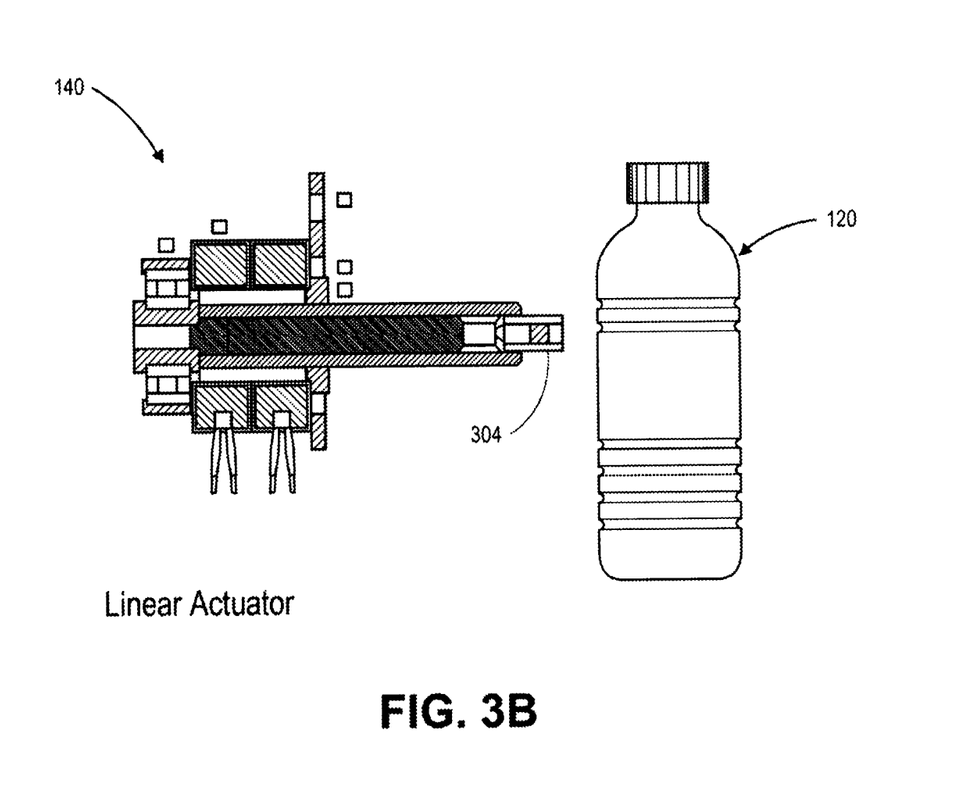

The controller 130 is configured or operable to control the translation of the linear actuator 140. As shown in FIGS. 3A-B, one example of a suitable linear actuator 140 includes a base 302 that includes an actuation element such as a motor 320, coil and/or other mechanical and/or electro-mechanical devices, and a translatable member or shaft 304 that is controllably moved thereby. The translatable member or shaft 304 is movable between a home or initial position 310 and an extended position 312 (shown in phantom). A linear or position encoder 330 may be used to track or determine the position of the translatable member 304, e.g., relative to a pre-determined or selected reference position or relative to a portion or surface of the base 302.

Examples of linear actuators 140 and controllers 130 that may be utilized in embodiments include, but are not limited to, linear actuators 140 and controllers 130 available from SMAC, Carlsbad, Calif. For example, LAL95 linear actuators 140 and LAC-1 controllers 130 available from SMAC may be utilized in embodiments. SMAC linear actuator and controller product information and user manuals are included in Appendix 1 of U.S. Provisional Application No. 61/240,849, the contents of which were previously incorporated herein by reference as though set forth in full. It should be understood that other linear actuators 140 and controllers 130, and linear actuators 140 and controllers 130 from other sources or manufacturers may be utilized in embodiments.

The controller 130 as shown in FIG. 1 may include only a controller for the linear actuator 140 and/or a separate computer, processing element or other control element. For ease of explanation and illustration, FIG. 1 illustrates a controller 130 generally, but it should be understood that the controller 130 may be a singular control element or include multiple control elements. Further, the controller 130 may be operably coupled to control other parts of the system 100 such as motors 114 that drive the conveyor 110. Further, the controller 130 may utilize software, hardware or a combination thereof.

Electrical parameters 340 of the linear actuator 140 change based on contact with the container 120, and feedback 350 is provided from the linear actuator 140 to the controller 130. For example, one or more or all of voltage, current and impedance may change as the translatable member 304 comes into contact with a portion of the container 120. For example, electrical current of the linear actuator 140 may change by a greater degree when in contact with a properly sealed container 120 that exerts more force upon the translatable member 304 compared to a low pressure or improperly sealed container 120 that exerts less force than a properly sealed container 120. As shown in FIG. 1, feedback 350 related to one or more electrical parameters 340 is provided to the controller 130, which processes the feedback 350 to determine whether the container 120 has a leak, unacceptable pressure and/or unacceptable vacuum, in which case the controller 130 may provide performance feedback concerning an upstream component or may cause a downstream system component 150 to reject, sort or otherwise process the defective container 120 as necessary.

As illustrated in FIG. 1, a stabilization member 160 is positioned opposite the linear actuator 140 such that the container 120 is positionable between the shaft or translatable member 304 and the stabilization member 160, which provides support to the container 120 when the linear actuator 140 contacts the container 120. Examples of stabilization members 160 that may be utilized with embodiments include, but are not limited to, a starwheel 400 (shown in FIG. 4), a worm gear 500 (shown in FIG. 5) and a portion of guide rail of the conveyor 110 that narrows combined with backpressure to hold the container 120 stable. A component of another piece of equipment on the bottling line such as, for example, the capper or labeler may also be utilized or this purpose.

Figure 4:
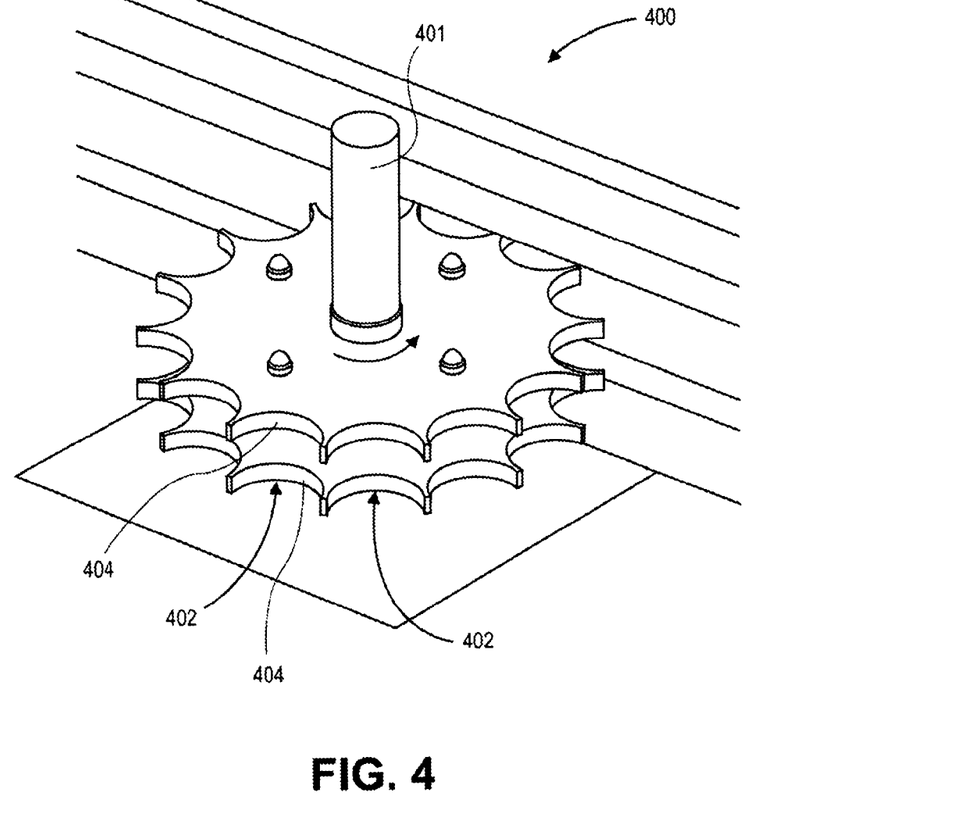
FIG. 4 illustrates one embodiment of a support or stabilization member in the form of a star wheel

In the embodiment illustrated in FIG. 4, a starwheel 400 is rotatable about an axis 401 by a motor (not illustrated in FIG. 4) and includes semi-circular pockets 402 for receiving containers 120. As the containers 120 are transported on the conveyor 110, they temporarily enter a pocket 402, and an inner surface or arcuate wall 404 of the pocket 402 provides support to the container 120 as the linear actuator 140 is translated to strike the container 120. The starwheel 400 rotates to release the container 120 downstream as other containers 120 enter upstream star wheel pockets 402 and the linear actuator 140 strikes those new containers 120. The starwheel 400 may be driven by a motor (not illustrated in FIG. 4) or be a free-wheeling component depending on factors such as pressure and other conveyor line conditions. In the illustrated embodiment, the stabilization member 160 rotates about an axis perpendicular to a plane of the conveyor 110 and perpendicular to the plane of translation of the linear actuator 140.

Figure 5:
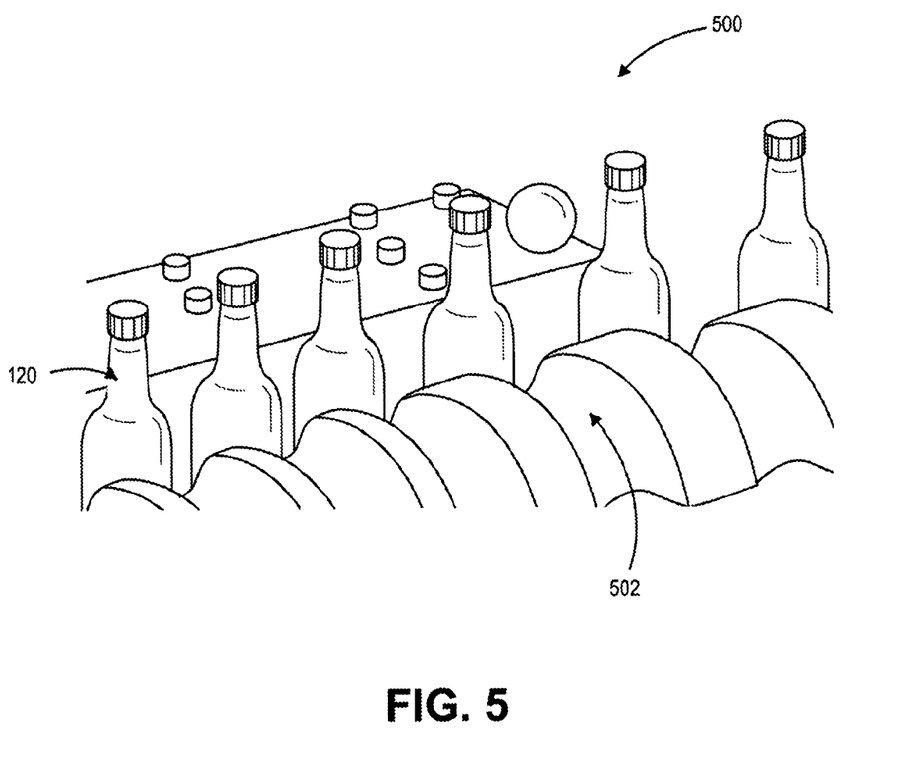
FIG. 5 illustrates one embodiment of a support or stabilization member in the form of a worm gear.

In the embodiment illustrated in FIG. 5, the stabilization member 160 in the form of a worm gear 500 includes a threaded slot 502 or cavity that is sufficiently wide to receive a container 120. The worm gear 500 rotates while the containers 120 are transported on the conveyor 120 and provide support to the containers 120. The worm gear 500 may be driven by a motor (not illustrated in FIG. 5) or be a free-wheeling component depending on factors such as pressure and other conveyor line conditions. In this embodiment, the worm gear 500 rotation axis is parallel to the conveyor 110 direction.

Figure 6:
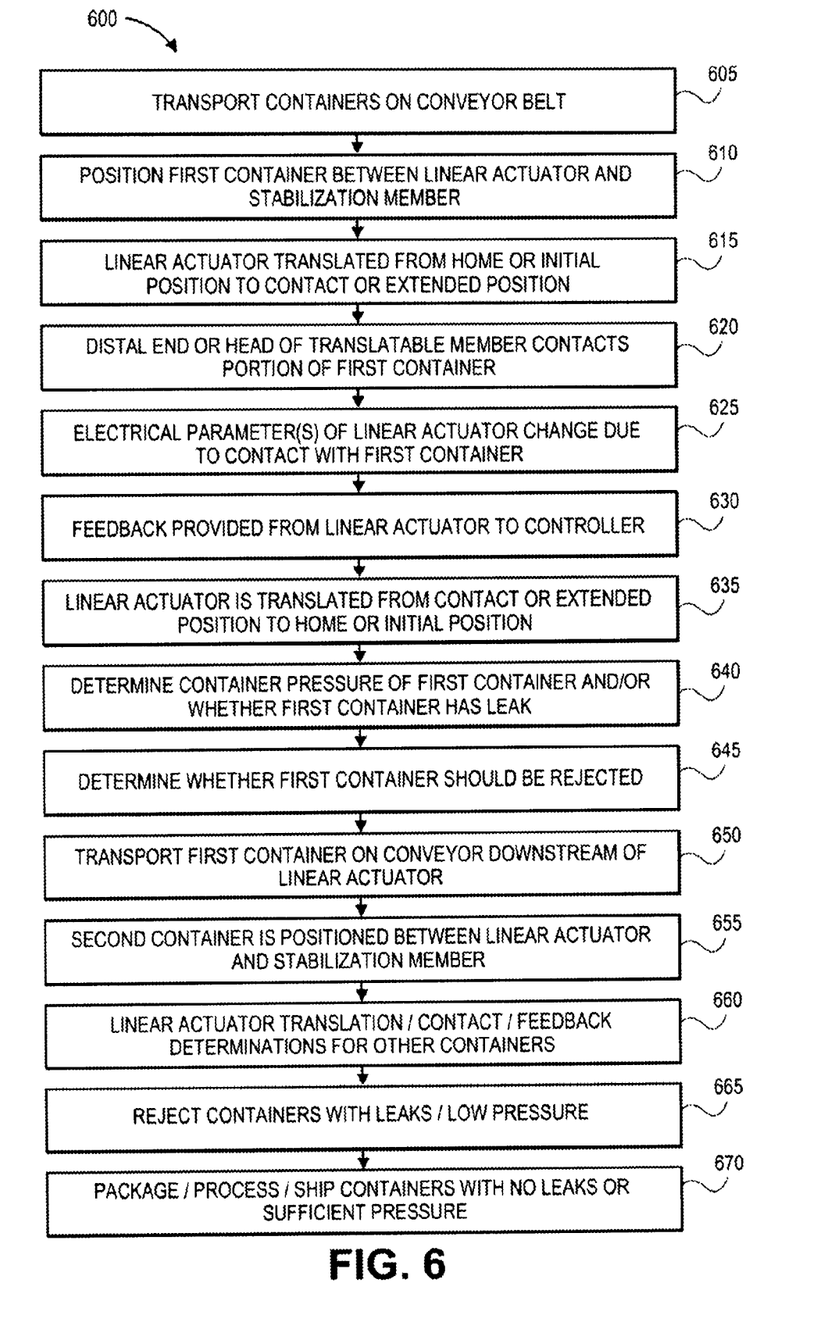
FIG. 6 is a flow diagram of one embodiment of a method of inspecting containers utilizing a linear actuator.

Referring to FIG. 6, a method 600 for inspecting containers 120 to detect whether a sealed or capped container 120 has a leak, unacceptable pressure and/or unacceptable vacuum (e.g., utilizing the system 100 and system components illustrated in FIGS. 1-5) comprises, transporting containers 120 on the conveyor 110 at stage 605 such that at stage 610, a first container 120a is positioned between the linear actuator 140 and the stabilization member 160. Embodiments may be utilized to transport various numbers of containers 120 at various speeds to account for bottling line and inspection variances. For example, embodiments may be utilized for automated processing of containers 120 at rates up to about 72,000 containers per hour. Embodiments can be adjusted or adapted to slower or faster processing speeds.

At stage 615, and referring again to FIGS. 3A-B, the translatable member 304 of the linear actuator 140 is moved from the home or initial position 310 to the contact or extended position 312 such that at stage 620, a distal end or head of translatable member 304 contacts a portion of a first container 120. At stage 625, electrical parameter(s) 340 of the linear actuator 140 change as a result of contact with the first container 120, and feedback 350 related to these changed electrical parameters 340 is provided to the controller 130 at stage 630. At stage 635, the translatable member 304 is moved back to the home position 310. At stage 640, the controller 130 analyzes the received feedback 350 to determine the force exerted by the container 120 and whether the container 120 has a leak, unacceptable pressure and/or unacceptable vacuum such that the container 120 should be rejected or otherwise processed in an appropriate manner at stage 645. In addition, feedback may be provided with respect to the responsible upstream component.

Figure 7A:
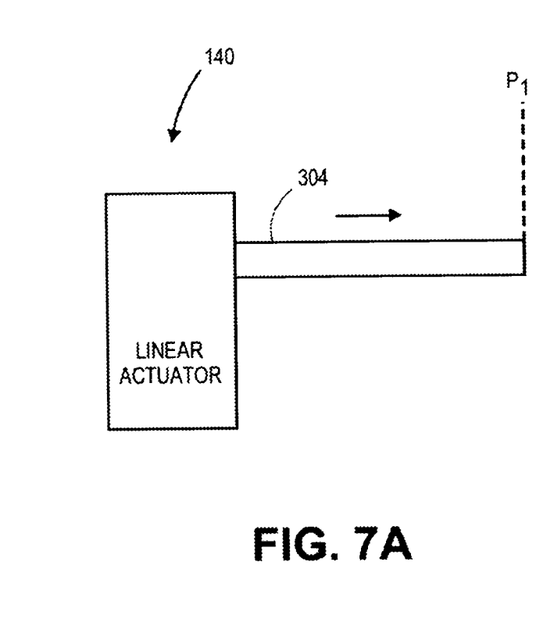
FIGS. 7A-B illustrate one embodiment of inspecting containers utilizing a linear actuator and determining forces exerted by a container based at least in part upon a position difference of a head or end of a shaft or translatable member of a linear actuator.
Figure 7B:
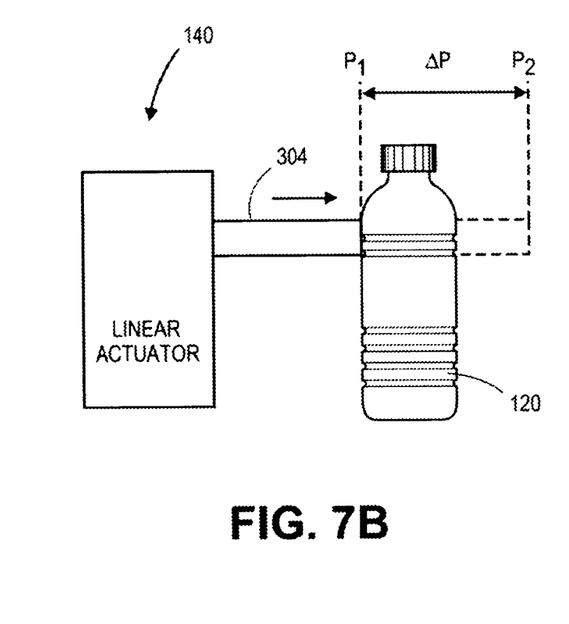

According to one embodiment, with further reference to FIGS. 7A-B, feedback 350 received from the linear actuator 140 relates to a change of position of the translatable member 304 of the linear actuator 140, which is used by the controller 130 to determine the force exerted by the container 120 to the end or head of the translatable member 304. The controller 130 determines whether the force is outside pre-determined force parameters in which case it is determined that the container has a leak or unacceptable pressure or vacuum such that the container 120 should be rejected or otherwise directed out of the production stream. In addition, feedback may be provided with respect to the responsible upstream component.

For example, position change may involve a comparison of a position of the translatable member 304 in the absence of a container 120, or when unencumbered or allowed to extend without interference versus a position of the translatable member 304 when striking the container 120. The unencumbered position may be a partially or fully extended position (generally, "extended" position"). FIG. 7A illustrates an initial or home position 310 and an extended position 312 assuming the linear translator does not strike the container (position P1), and FIG. 7B illustrates a position (position P2) of the end of the translatable member 304 when striking the container 120. The range of movement of the translatable member 304 may, for example, be about 25-50 millimeters and may vary depending on container 120 diameter or width and/or the portion of the container 120 that is to be contacted by the translatable member 304. In one embodiment, a container 120 having a leak or low pressure will result in the shaft 304 pushing into the container 120 more than a container 120 that does not have a leak or that has sufficient pressure at a given force. A linear encoder 330 and position feedback 350 provided by the linear actuator 140 may be utilized for the purpose of determining position changes and corresponding forces. In an alternative embodiment, a sensor or measurement device (not illustrated in Figures) such as a laser, a camera, or a light sensor or similar device is used to measure the movement of the end of the translatable member 304 of the linear actuator 140. These position changes and/or corresponding forces may then be used to determine whether a downstream component should reject or otherwise process the container 120 and/or to provide feedback regarding performance of upstream system components.

Figure 8A:
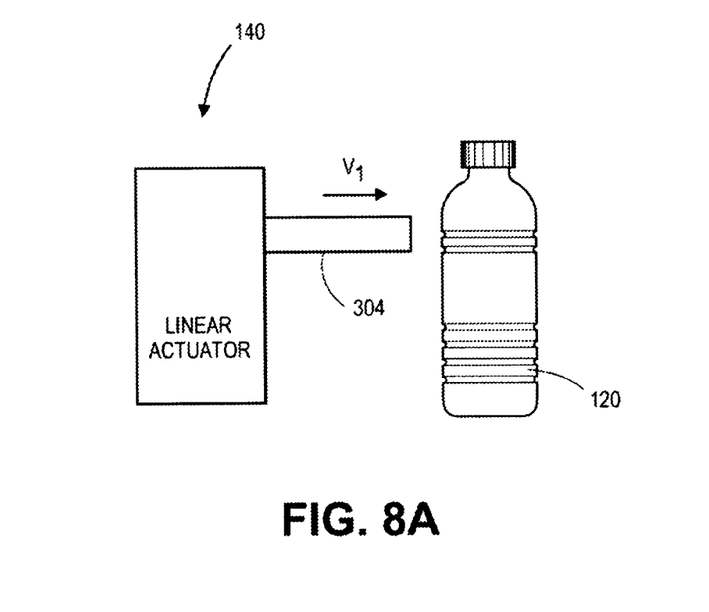
FIGS. 8A-B illustrate one embodiment for inspecting containers utilizing a linear actuator and determining forces exerted by a container based at least in part upon changes of velocity of a head or end of the shaft or translatable member as the shaft or translatable member contacts a container.
Figure 8B:
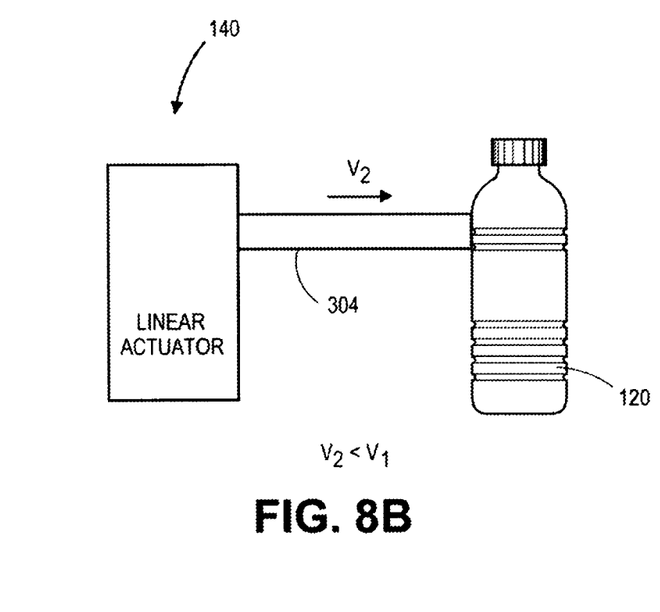

According to another embodiment, with reference to FIGS. 8A-B, feedback 350 from the linear actuator 140 relates to the decrease in velocity of the translatable member 304 of the linear actuator 140, or comparing a velocity (V1) of the translatable member 304 before striking the container 120, or in the absence of a container 120 when unencumbered, versus a velocity (V2) of the translatable member 304 upon or after striking the container 120. Embodiments may be utilized to determine whether the container 120 has a leak, unacceptable pressure and/or unacceptable vacuum. For example, the change of position of the translatable member 304 is measured at the time that it approaches or is at zero velocity and is used by the controller 130 to determine the force exerted by the container 120 to the end or head of the translatable member 304 and whether the force is less than a pre-determined force in which case it is determined that the container has a leak or low or high pressure. In certain embodiments, stage 635 involves analyzing velocity changes to determine a force exerted by the container 120 on the linear actuator 140 and velocity control feedback may be utilized to monitor velocity changes. These velocity changes and/or corresponding forces may then be used to determine whether a downstream component should reject or otherwise process the container 120 and/or to provide feedback regarding performance of upstream system components.

According to another embodiment, feedback 350 from the linear actuator 140/controller 130 relates to a torque/force, which is related to a change of current in the linear actuator 140 resulting from contact with the container 120. For example, the torque change can be used by the controller 130 to, as necessary, determine the force exerted by the container 120 to the end or head of the translatable member 304 and whether the force is less than or more than a pre-determined force in which case it is determined that the container has a leak, high or low pressure or unacceptable vacuum. These changes and/or corresponding forces may then be used to determine whether a downstream component should reject or otherwise process the container 120 and/or to provide feedback regarding performance of upstream system components.

Embodiments may involve a single electrical parameter 340 (one of current, voltage and impedance) and one type of feedback 350 (one of position, velocity, and torque/force). Embodiments may also involve two or more types of electrical parameters 340 and two or more types of feedback 350, e.g., position and torque/force, velocity and torque/force, position and velocity, and all three of these types of feedback 350.

At stage 650, following contact with the linear actuator 140 and related feedback determinations, the first container 120 is transported by the conveyor 110 downstream of the linear actuator 140, and at stage 655, a second or next container 120 is positioned between linear actuator 140 and the stabilization member 160 and is analyzed as described above at stage 660.

Figure 9:
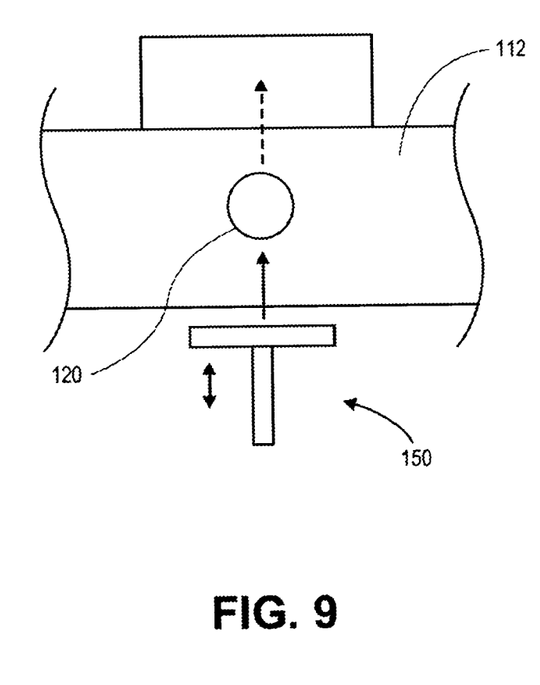
FIG. 9 illustrates one example of a downstream rejection member in the form of a pusher that may be utilized in embodiments.

Containers 120 determined to have a leak or insufficient pressure may then be rejected or processed accordingly at stage 665 or transported to other stations at 670 for labeling or packaging. For example, referring to FIG. 9, a downstream rejection member 150 may be in the form of a pusher that is used to push defective containers off of the conveyor 110 and into a collector for defective containers 120.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of embodiments.

As will be understood upon reading the above disclosure and related figures, embodiments are able to process and inspect containers in an effective manner while eliminating or improving upon various aspects of known systems by eliminating components and associated steps of known systems and methods and by providing high-speed, automated processing and inspection of containers without the need for belts for compressing containers, thereby reducing maintenance and costly system downtime and reducing leaks caused by compression of containers by belts.

Further, although FIG. 6 illustrates certain steps in a particular sequence, it should be understood that methods and steps described above may be performed in different orders and concurrently or in parallel. For example, determinations relating to the feedback and whether to reject a certain container may be performed while the container is positioned between the linear actuator and the stabilization element, or thereafter, and such steps may occur while striking the next or second container.

Although embodiments are described with reference to a linear actuator that moves in a direction that is perpendicular to the direction of a conveyor, in other embodiments, the linear actuator may be positioned above the container, and the linear actuator is moved to strike a cap of a container. Such embodiments may involve plastic or aluminum containers having plastic caps, for example, or more rigid containers (e.g., steel containers) that have plastic or other flexible caps. In these embodiments, the feedback resulting from changes of electrical parameters of the linear actuator resulting from striking the cap is used to determine whether a container has a proper seal, pressure and/or vacuum. For example, embodiments may be utilized or adapted for inspection of different container attributes including whether a container is properly sealed or has leaks, whether the container pressure is too high or too low and whether a vacuum level is too low. For example, in certain cases embodiments are used to detect actual container leaks. In other cases, embodiments are used to detect excessive or insufficient pressures in properly sealed containers. For example, when nitrogen dosing water bottles, there may be a brief interruption in the dosing flow such that the there is a delay in capping the container. As a result, the container may be properly sealed but is not properly pressurized since part of the nitrogen dosing will have dissipated between dosing and capping steps.

Additionally, while embodiments are described with reference to a linear actuator that strikes a sidewall of a container, various portions of the sidewall may be used and other portions of the container may also be used. For example, the sidewall (bottom, middle and top portions), cap or lid and crown or shoulder portions may also be contacted by a linear actuator, and the linear actuator can be positioned and controlled depending on the bottle size and shape. Further, linear actuator controls can be adjusted for bottle shape, size, material type, material thickness, fluid viscosity and head room or fluid fill level. The detected position, velocity and/or torque or force changes may vary depending on these bottle and fluid parameters and on the inspection line configuration and speed.

Moreover, embodiments may be used to inspect filled and capped containers for leaks, high pressure, low pressure, high vacuum and low vacuum. Embodiments may also be used to inspect nitrogen dosed containers. For example, the force that the linear actuator registers will be below the acceptable range if a container is not adequately pressurized or if it has a leak. In the case of nitrogen dosed containers, the force that the linear actuator registers will be above the acceptable range if the container is over pressurized. The pressure ranges will vary depending on the viscosity of the liquid, the size and thickness of the container, the material that the container is made of and the amount of headroom or air at the top of the container.

Linear actuator controls can be adjusted or determined to account or adjust for one or more variances of speeds of bottling or canning lines, resulting variance in bottle inspection rate, varying bottle diameters, container materials, thickness, shape and dimensions. Further, linear actuator controls can be adjusted depending on nitrogen dosing and the fill level and viscosity of fluids in containers. Thus, it may be the case that a linear actuator is translated 30-50 mm or different distances depending on one or more of these factors.

Additionally, feedback provided by the linear actuator may relate to changes in voltage, current and/or impedance and involve one or more of changes in position, velocity and torque/force. Further, certain feedback parameters may be based on holding certain electrical parameters constant or allowing them to change. For example, torque/force feedback is based on changes in electrical current, but in other embodiments, current may be a constant in order to detect other types of feedback.

Further, the linear actuator parameters, such as the velocity at which the linear actuator moves from the home position to the contact position, the force applied to the container by the linear actuator and/or the time during which the linear actuator contacts the container may be adjusted depending on container configurations such as the shape, size, fluid level and type or viscosity of fluid. Moreover, forces that that are used to determine whether a container should be rejected or accepted may vary depending on factors including one or more of these factors. Thus, the threshold for rejecting or accepting containers may change, e.g., threshold forces for water and sports drinks may differ from threshold forces for oils and other fluids having different viscosities.

Additionally, although certain embodiments are described with reference to utilizing a linear actuator to determine whether a downstream component should reject, sort or otherwise process a container having a leak or unacceptable pressures or vacuum, embodiments may also be used for providing performance feedback concerning upstream components such as, for example, a filler, capper or other upstream device or component. Thus, embodiments may involve determining whether a downstream component should reject, sort or otherwise process a container, performance feedback concerning upstream components, or both.

Embodiments may also be implemented to consider different types feedback from the linear actuator as equally weighted, or software and/or hardware may be configured and executed to assign certain weights or values to different types of feedback if multiple types of feedback are utilized and certain types of feedback should be emphasized or prioritized.

What is claimed is:

1. A method of inspecting a semi-rigid, filled and capped container comprising a base, a cap and a sidewall extending between the base and the cap, the method comprising:

transporting the semi-rigid, filled and capped container on a conveyor to an inspection area while the container stands upright on the base on the conveyor and is positioned between a rotatable support member and a linear actuation system located in the inspection area and comprising a programmable controller operably coupled to an electronically controlled linear actuator to electronically control the linear actuator, the container being positioned between the rotatable support member and a distal end of a translatable member of the electronically controlled linear actuator;

activating the electronically controlled linear actuator in response to an output of the programmable controller to move the translatable member from an initial position at which a distal end of the translatable member does not engage a portion of the container to an extended position at which the distal end temporarily engages the sidewall and pushes the container against the rotatable support member;

detecting, without use of a load cell or force transducer, respective electrical feedback parameters of the linear actuator associated with a change of velocity of the translatable member and at least one of a change of position of the translatable member and a torque or force exerted by the container on the translatable member resulting from the translatable member contacting the sidewall, wherein the torque or force is based at least in part upon an electrical current of the linear actuator and the change of position is based at least in part upon an output of a linear encoder of the linear actuator; providing the detected electrical feedback controller as an input to the programmable controller; and determining, with the programmable controller, whether the container satisfies pre-determined inspection criteria based at least in part upon the detected electrical feedback parameters.

2. The method of claim 1, the distal end of the translatable member contacting a portion of the sidewall of the container made of plastic or aluminum.

3. The method of claim 1, the pre-determined inspection criteria comprising whether the container is properly sealed, and determining whether the container is properly sealed being performed without compressing the container between belts and without determining a fill level of the container.

4. The method of claim 1, the electronic feedback parameters comprising the change of velocity and the torque or force, the programmable controller determining the torque or force exerted by the container when the distal end of the translatable member contacts the container, the torque or force being determined based at least in part upon a detected electrical feedback parameter comprising a detected current of the linear actuator.

5. The method of claim 4, further comprising rejecting or sorting the container when the torque or force does not satisfy pre-determined torque or force criteria.

6. The method of claim 1, the detected electrical feedback parameters being related to a component upstream of the linear actuator.

7. The method of claim 1, the change of velocity comprising a difference between a first velocity of the translatable member prior to contacting the sidewall and a second velocity of the translatable member when the translatable member contacts the sidewall.

8. The method of claim 7, further comprising rejecting or sorting the container when at least one of the change of velocity and the torque or force satisfies pre-determined velocity or force criteria.

9. The method of claim 1, the detected electrical feedback parameters comprising velocity and the change of position, the change of position being based at least in part upon a first, extended position of the translatable member resulting from the distal end of the translatable member moving freely and being unencumbered by the container, and a second position at which the translatable member contacts the portion of the container.

10. The method of claim 1, the container being moved in a first direction by the conveyor, and the translatable member being moved in a linear manner in a second direction that is substantially perpendicular to the first direction and parallel to the conveyor.

11. The method of claim 1, the support member being a star wheel or a worm gear.

12. The method of claim 1, wherein the pre-determined inspection criteria is whether the container is properly sealed, has excessive pressure, has insufficient pressure, or has inadequate vacuum.

13. The method of claim 1, further comprising:
transporting the container past the inspection area and transporting a second container that is semi-rigid, filled and capped to the inspection area, the second container being positioned between the rotatable support member in the inspection area and the distal end of the translatable member;
activating the electronically controlled linear actuator in response to an output of the programmable controller to move the translatable member from the an initial position at which a distal end of the translatable member does not engage a portion of the second container to an extended position at which the distal end temporarily engages the portion of the second container and pushes the second container against the support member;
detecting, without use of a load cell or force transducer, second respective electrical feedback parameters of the linear actuator associated with a second change of velocity of the translatable member and at least one of a second change of position of the translatable member and a second torque or force exerted by the capped and filled container on the translatable member resulting from the translatable member contacting the sidewall of the second container; providing the detected second electrical feedback controller as an input to the controller; and
determining, with the controller, whether the second container satisfies pre-determined inspection criteria based at least in part upon the detected second respective electrical feedback parameters.

14. The method of claim 13, the conveyor being in continuous motion while the linear actuator engages the first container and the second container.

15. A container inspection system, comprising:
a conveyor for transporting a semi-rigid, filled and capped container to an inspection area including a support member, the container comprising a base, a cap and a sidewall extending between the base and the cap;
a linear actuation system comprising:
an electronically controlled linear actuator comprising a translatable member, the container being positionable on the conveyor between the support member and a distal end of the translatable member; and
a programmable controller operably coupled to the linear actuator, the controller being configured to cause movement of the translatable member from an initial position at which the distal end of the translatable member does not engage a portion of the sidewall to an extended position at which the distal end temporarily engages the sidewall and pushes the container against the support member, and to detect, without use of a load cell or force transducer, respective electrical feedback parameters of the linear actuator associated with a change of velocity of the translatable member and at least one of a change of position of the translatable member and a torque or force exerted by container on the translatable member resulting from the translatable member contacting the sidewall, wherein the torque or force is based at least in part upon an electrical current of the linear actuator and the change of position is based at least in part upon an output of a linear encoder of the linear actuator, the controller being further configured to determine whether the container satisfies pre-determined inspection criteria based at least in part upon the detected electrical feedback parameters.

16. The system of claim 15, the programmable controller and the electronically controlled linear actuator forming a closed loop feedback system for controlling the translatable member and detecting the electrical feedback parameters.

17. The system of claim 15, the programmable controller being configured to determine whether the container satisfies pre-determined inspection criteria without the container being compressed with belts and without determining or sensing a fill level of the container.

18. The system of claim 15, the electronic feedback parameters comprising the change of velocity and the torque or force, the programmable controller being configured to determine the torque or force exerted by the container when the distal end of the translatable member contacts the container, the torque or force being determined based at least in part upon the detected electrical feedback parameter comprising the detected electrical current of the linear actuator.

19. The system of claim 15, the change of velocity comprising a difference between a first velocity of the translatable member prior to contacting the portion of the sidewall and a second velocity of the translatable member when the translatable member contacts the sidewall.

\* \* \* \* \*